United States Patent

Nishiwaki et al.

[11] Patent Number: 5,828,496
[45] Date of Patent: Oct. 27, 1998

[54] ILLUMINATION OPTICAL SYSTEM

[75] Inventors: Masayuki Nishiwaki, Kawasaki; Hiroshi Sugitani, Machida; Tsuyoshi Orikasa, Musashimurayama; Akira Goto, Yokohama, all of Japan

[73] Assignee: Canon Kabushiki Kaisha, Tokyo, Japan

[21] Appl. No.: 361,042

[22] Filed: Dec. 21, 1994

[30] Foreign Application Priority Data

Dec. 22, 1993 [JP] Japan .................................. 5-325156

[51] Int. Cl.$^6$ .................................................. G02B 27/10
[52] U.S. Cl. ............................ 359/626; 359/618; 355/55; 355/67
[58] Field of Search ..................................... 359/618, 619, 359/620, 621, 622, 623, 624, 625, 626; 355/55, 67

[56] References Cited

U.S. PATENT DOCUMENTS

| | | |
|---|---|---|
| 4,093,964 | 6/1978 | Aughton .................................. 358/302 |
| 4,682,885 | 7/1987 | Torigoe .................................... 355/67 |
| 4,733,944 | 3/1988 | Fahlen et al. ........................... 359/624 |
| 4,851,882 | 7/1989 | Takahashi et al. ....................... 355/46 |
| 5,091,744 | 2/1992 | Omata ..................................... 355/53 |
| 5,263,250 | 11/1993 | Nishiwaki et al. ................... 29/890.1 |

FOREIGN PATENT DOCUMENTS 0486316   5/1992   European Pat. Off. .

*Primary Examiner*—Georgia Y. Epps
*Assistant Examiner*—Dawn-Marie Bey
*Attorney, Agent, or Firm*—Fitzpatrick, Cella, Harper & Scinto

[57] ABSTRACT

An illumination optical system includes a beam dividing device for dividing a radiation beam into plural illumination beams, and an optical arrangement for superposing the illumination beams one upon another on a surface to be illuminated, the optical arrangement having different focal distances in substantially orthogonal first and second directions, and the optical arrangement being adapted to focus each of the illumination beams on the surface in the first direction while defocusing the same in the second direction, whereby a linear illumination region is defined on the surface.

43 Claims, 2 Drawing Sheets

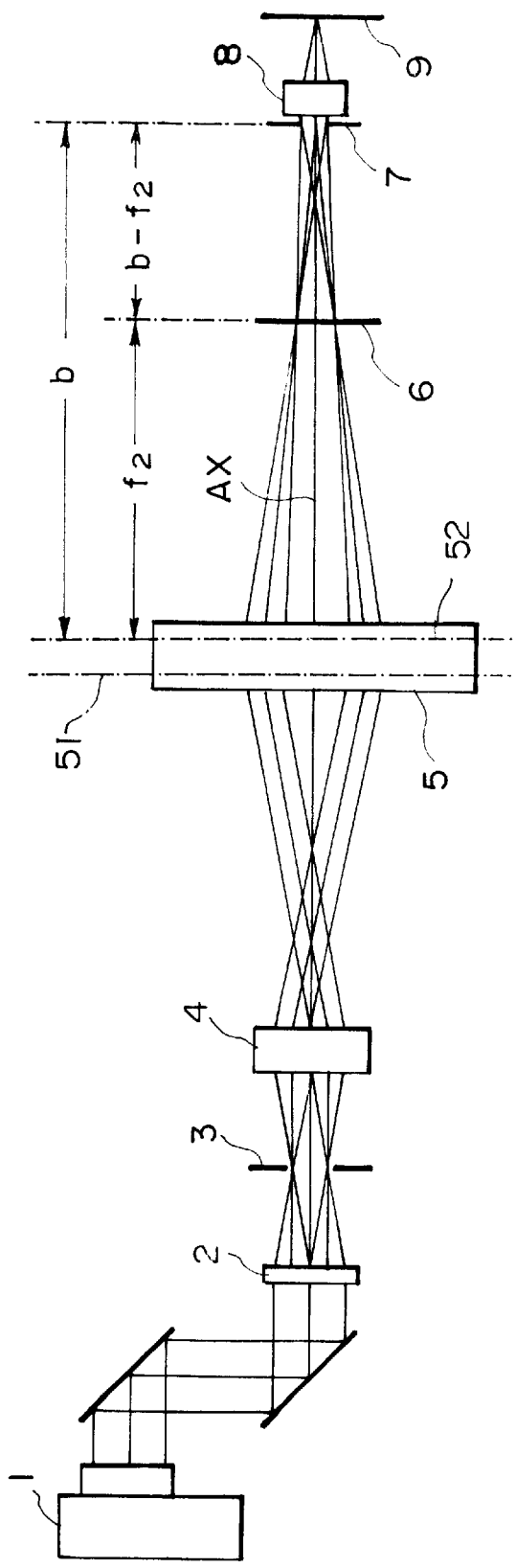
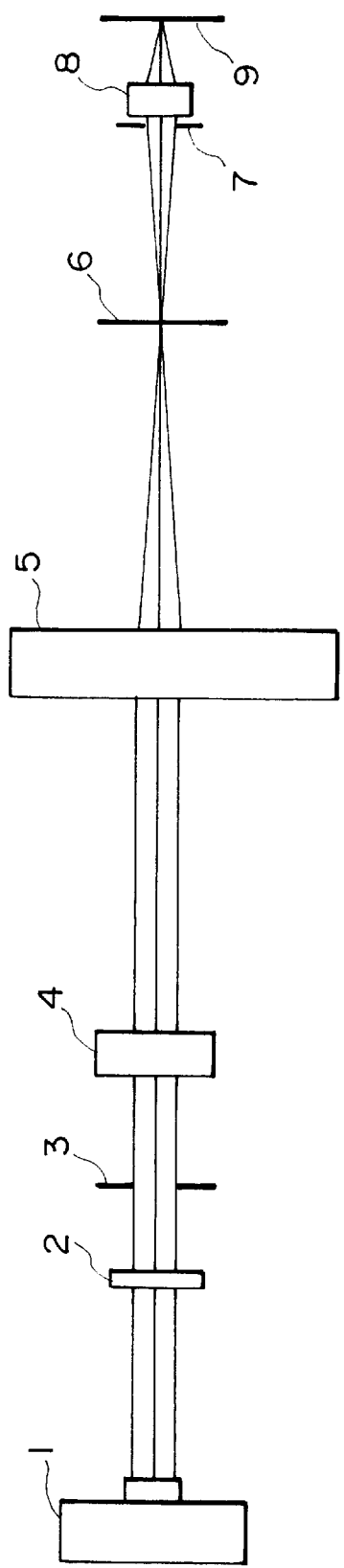
FIG. IA
FIG. IB

ILLUMINATION OPTICAL SYSTEM

FIELD OF THE INVENTION AND RELATED ART

This invention relates to improvements in an illumination optical system for use in a laser machining apparatus or an exposure apparatus, for example.

Generally, an illumination optical system in a laser machining apparatus or an exposure apparatus of mask projection type uses a fly's eye lens having lenses arrayed two-dimensionally.

In such an illumination system, light projected from a laser light source is expanded or contracted by an optical unit so that it is shaped to the size of an entrance opening of the fly's eye lens. The thus shaped light impinges on the lenses of the fly's eye lens and it is divided by them. The divided light beams are then superposed one upon another on a mask, such that the mask illuminating light has uniform illuminance over a wide field. In response to the illumination of the mask with uniform illuminance light, a mask pattern is formed on a sample.

In this type of illumination optical system, the light from a light source is projected uniformly in a wide field upon a mask through a fly's eye lens. This leads to a loss of energy if a one-dimensional linear mask pattern is illuminated.

SUMMARY OF THE INVENTION

It is an object of the present invention to provide an illumination optical system of small energy loss.

In accordance with a first aspect of the present invention, there is provided an illumination optical system, comprising: beam dividing means for dividing a radiation beam into plural illumination beams; and an optical arrangement for superposing the illumination beams one upon another on a surface to be illuminated, said optical arrangement having different focal distances in substantially orthogonal first and second directions, and said optical arrangement being adapted to focus each of the illumination beams on said surface in the first direction while defocusing the same in the second direction, whereby a linear illumination region is defined on said surface.

In a preferred form of this aspect of the present invention, said beam dividing means divides a wavefront of the radiation beam.

In another preferred form of this aspect of the present invention, the radiation beam comprises a laser beam.

In a further preferred form of this aspect of the present invention, the illumination optical system further comprises an excimer laser which supplies the laser beam.

In a still further preferred form of this aspect of the present invention, said optical arrangement includes an anamorphic optical system for focusing each of the illumination beams with respect to a direction of beam division by said beam dividing means, and a collecting optical system for focusing each of the illumination beams from said anamorphic optical system upon said surface with respect to a direction perpendicular to the direction of beam division while defocusing the same with respect to the direction of beam division.

In a still further preferred form of this aspect of the present invention, said anamorphic optical system comprises a cylindrical lens.

In a still further preferred form of this aspect of the present invention, said collecting optical system has the same focal length with respect to the direction of beam division and to the direction perpendicular to the direction of beam division.

In a still further preferred form of this aspect of the present invention, said beam dividing means divides the radiation beam so that central rays of the illumination beams intersect with each other at a front focal point position of said anamorphic optical system with respect to the direction of beam division.

In a still further preferred form of this aspect of the present invention, said beam dividing means includes at least one prism for deflecting at least one of the illumination beams.

In a still further preferred form of this aspect of the present invention, said illumination optical system further comprises an excimer laser for supplying the laser beam.

In accordance with a second aspect of the present invention, there is provided an optical apparatus for processing a workpiece, comprising: beam dividing means for dividing a radiation beam into plural illumination beams; and an optical arrangement for superposing the illumination beams one upon another on a mask, said optical arrangement having different focal distances in substantially orthogonal first and second directions, and said optical arrangement being adapted to focus each of the illumination beams on the mask in the first direction while defocusing the same in the second direction, whereby a linear illumination region is defined on the mask, wherein the illumination region is defined in a linear pattern region on the mask and the workpiece is exposed in accordance with a pattern provided in the pattern region of the mask.

In accordance with a third aspect of the present invention, there is provided a device manufacturing method for forming a device pattern on a workpiece on the basis of the illumination optical system according to the first aspect of the present invention as described above or by using the apparatus according to the second aspect of the present invention as described above.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A and 1B are schematic views, respectively, of an illumination optical system according to an embodiment of the present invention, wherein FIG. 1A is a side view of the illumination optical system as viewed from a direction perpendicular to the direction of light division, and FIG. 1B is a top view of the same as viewed in the direction of light division.

DESCRIPTION OF THE PREFERRED EMBODIMENTS

Figure 2:
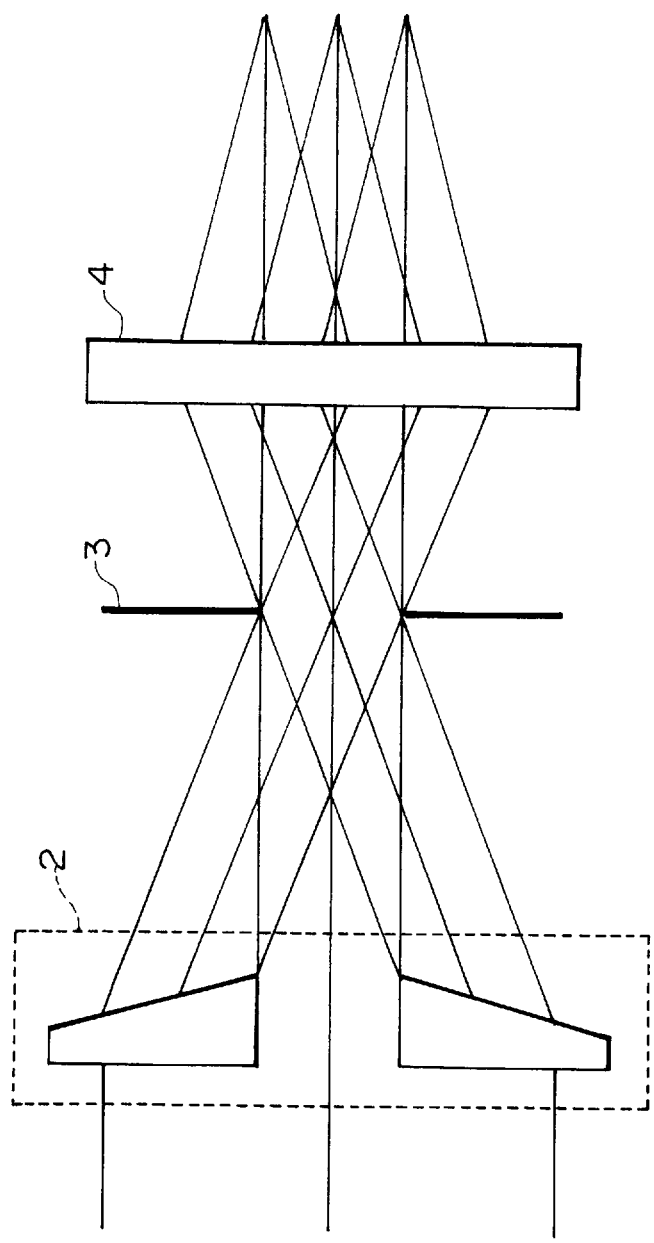
FIG. 2 is an enlarged view wherein a prism unit 2, a light blocking mask 3 and a cylindrical lens unit 4 of FIG. 1A are illustrated.

An embodiment of the present invention will be described with reference to the drawings.

FIGS. 1A and 1B are schematic views, respectively, of an illumination optical system according to an embodiment of the present invention, wherein FIG. 1A is a side view of the same as viewed from a direction perpendicular to the direction of light division, and FIG. 1B is a top view of the same as viewed in the direction of light division. FIG. 2 is an enlarged view wherein a prism unit 2, a light blocking mask 3 and a cylindrical lens unit 4 of FIG. 1A are illustrated in an enlarged scale.

The illumination optical system of this embodiment comprises a laser light source 1 such as a KrF excimer laser, for example, as well as a prism unit 2, a light blocking mask 3, a cylindrical lens unit 4 and a rotationally symmetrical convex lens 5 which are disposed in this order along the direction of advancement of a beam from the laser light source 1, which beam is collimated and is substantially coherent. Denoted at 51 and 52 are first (front) and second (rear) principal planes of the convex lens 5.

As best seen in FIG. 2, the prism unit 2 comprises two prisms which are juxtaposed along the direction of light division so that they are opposed to each other with respect to the emission optical axis (chief light ray) of the laser light source 1. In this embodiment, the prism unit 2 serves to trisect the light from the light source 1 and to direct the divided beams in different directions.

The light blocking mask 3 has a rectangular opening, at its central portion, whose minor (shorter) side length corresponds to the width of the divided beam in the direction of light division. It is placed at the position of intersection of the beams, being trisected by the prism unit 2, so that the longitudinal (major) direction of the opening of the blocking member extends perpendicular to the direction of light division. This light blocking mask 3 serves to block unwanted light such as scattered light at the time of light transmission.

The cylindrical lens unit 4 comprises an optical system having a rotationally asymmetrical focal length or refracting power, such as an anamorphic optical element, for example. It is disposed so that the light blocking mask 3 is placed at the first (front) focal point position of the cylindrical lens unit, upon the plane including the direction of light division. The convex lens 5 is disposed at a predetermined position after the cylindrical lens unit 4.

When this illumination optical system is incorporated into a laser machining apparatus or an exposure apparatus, a mask 6 (FIG. 1A or 1B) having a device pattern formed thereon is disposed at the second (rear) focal point position of the convex lens 5. A stop 7 and a projection lens 8 are disposed after the mask 6. Also, a sample (workpiece) 9 is placed at a second (rear) focal point position of the projection lens 8. As for this sample, a resist material or a heat processable material such as plastic may be used, for example. In this embodiment, the mask 6 has a number of holes formed thereon and arrayed along the direction of light division. These holes of the mask are going to be illuminated in this embodiment with illumination light having a uniform illuminance distribution and having a linear shape in the light division direction.

The light emitted by the light source 1 is divided by the prism unit 2 into three light beams. The thus trisected light beams once intersect with each other at the position of the light blocking mask 3, namely, at the front focal point position of the cylindrical lens unit 4. After removal of any unwanted light by the light blocking mask 3, these light beams are projected on the cylindrical lens unit 4 along different directions. Central rays of the three projected light beams, having passed through the center of the opening of the light blocking mask 3, are projected out of the cylindrical lens unit 4 parallel to the optical axis AX of the illumination optical system. Each of the three light beams emerging from the cylindrical lens unit 4 is once converged linearly, at the rear focal point position of the lens unit 4 and, thereafter, they enter the convex lens 5. By this convex lens 5, the three light beams are superposed one upon another at the rear focal point position of the convex lens 5, namely, upon the mask 6, such that a linear image of approximately uniform illuminance distribution is projected on the mask 6. This linear image is produced by the three light beams projected on the surface of the mask 6 which are defocused with respect to the direction of the hole array and focused with respect to the direction perpendicular to the direction of the hole array. The projection lens 8 serves to project an image of the hole array of the mask 6 onto the sample 9, by which corresponding holes are formed on the sample 9. The thus processed sample 9 is going to be used, in this embodiment, as an ink discharging nozzle plate for an ink jet printer. At the position of the stop 7 of the projection lens 8, the three light beams are focused with respect to the direction of the hole array and are defocused with respect to the direction perpendicular to the direction of the hole array.

In the illumination optical system described above, the focal length $f_1$ of the cylindrical lens unit 4 is determined by the width of the divided light beam, the focal length of the convex lens 5 and the length of the linear light (image) being projected on the mask 6. Here, if the width of the light impinging on the prism unit 2 is denoted by a, the focal length of the convex lens 5 is denoted by $f_2$, the relay magnification of the convex lens 5 is denoted by m, the distance to the stop 7 (image plane) from the rear principal plane of the convex lens 5 is denoted by b, and the length of the linear light (image) imaged on the mask 6 is denoted by L, then the focal length $f_1$ of the cylindrical lens unit 4 is given by the following equation:

$$f_1 = (a/n)[(b-f_2)/L][|1/m|]$$

The shape of the pattern region of the mask is linear (one-dimensional hole array) and, therefore, the length L of the image may well be larger than the length of the hole array of the mask 6. Thus, the focal length $f_1$ of the cylindrical lens unit 4 may be set to satisfy the following relation:

$$f_1 \leq (a/n)[(b-f_2)/L][|1/m|]$$

wherein $L_m$ is the length of the hole array of the mask.

Next, the emission angle, that is, the angle defined between the optical axis AX of the illumination optical system and each of the light beams emerging from the two prisms of the prism unit, is calculated.

The emission angle of each light beam emitted from the prism is determined by the focal length $f_1$ of the cylindrical lens unit 4 and the diameter A of the stop 7. Since in the illumination optical system described above the convex lens 5 serves to image each of the light beams divided by the prism unit 2, on the mask 6 and also to re-image the three linear light source images formed by the cylindrical lens unit 4, upon the stop 7, the size of the three light source images formed by the cylindrical lens unit 4 should not be larger than A/m (m is the imaging magnification of the convex lens 5). Thus, the central rays of the three light beams emitted from the prism unit 2 should satisfy the following relation:

$$f_1 \cdot \tan \theta_{max} \leq (A/2)/m$$

wherein $\theta_{max}$ is the angle defined between the optical axis AX and the three central rays emitted from the prism unit 2.

As best seen in FIGS. 1A and 1B, in the illumination optical system described above, with respect to the direction of light division and with respect to a direction perpendicular to the direction of light division, the light beams divided by the prism unit 2 are influenced differently by the prism unit 2 and the cylindrical lens 4. More specifically, with respect to the direction of light division, the light emitted by the laser light source 1 is influenced by the prism unit 2 and the cylindrical lens 4 so that it is trisected and converged. With respect to the direction perpendicular to the direction of light division, however, the light is not influenced by the prism unit 2 or the cylindrical lens 4, and the light emerges from the cylindrical lens 4 while the state of the light as the same is incident on the prism unit 2 is retained.

When the three light beams emitted by the cylindrical lens 4 in the manner described above are superposed one upon another by the convex lens 5 on the mask 6, the size of the linear image being projected on the mask 6, in the direction perpendicular to the direction of light division, is determined by the diversion angle of the laser light source 1 as well as the aberration and the focal length of the convex lens 5. It is to be noted here that, because of a small view angle of the illumination optical system in the direction perpendicular to the direction of light division, the aberration of the convex lens 5 may not be a direct and major factor. Thus, the width d of the light emitted by the laser light source 1 in the direction perpendicular to the direction of light division, can be given by the following equation:

$$d = wf_2$$

where w is the diversion angle of the laser light source 1 and $f_2$ is the focal length of the convex lens 5.

Also, if the width of the mask 6 in the direction perpendicular to the direction of light division is denoted by $L_w$, to this width $L_w$ of the mask 6 the width d of the light in the direction perpendicular to the direction of light division may be set to satisfy the following relation:

$$d > L_w.$$

With the setting of the illumination optical system as described hereinbefore, linear illumination light of approximately uniform illuminance distribution is attainable over the mask 6. As such illumination light is projected on the mask 6, the light passes the hole array of the mask and, after being restricted by the stop 7 to a predetermined size, it is projected by the projection lens 8 onto the sample 9. As a result of this, the pattern of the mask 6, that is, the hole array, is reproduced on the sample 9.

Since, in the described illumination system the light emitted by the laser light source 1 directly impinges on the prism unit 2, the size of the light cannot be adjusted in accordance with the entrance opening of the prism unit 2. However, an optical unit for magnifying or de-magnifying light may be provided between the laser light source 1 and the prism unit 2 so as to adjust the size of light in accordance with the entrance opening of the prism unit 2. This assures good efficiency of use of the light emitted by the laser light source 1.

While in this embodiment a laser light source is used as the light source of the illumination optical system, any light source other than a laser light source, such as a white light source, for example, may be used provided that the light from the light source can be rectified into parallel light such as a laser light.

Also, while the prism unit of the illumination optical system of this embodiment is provided by two prisms for trisecting received light, the number of light division as well as the number of prisms to be used are not limited to this, if illumination light of uniform illuminance can be provided on the mask 6.

Still further, while the present embodiment uses the prism unit 2 as the means for dividing the light from the laser light source 1, a mirror of small reflection loss may alternatively be used to divide the light, provided that the divided light beams can be superposed one upon another precisely at a predetermined position.

While the invention has been described with reference to the structures disclosed herein, it is not confined to the details set forth and this application is intended to cover such modifications or changes as may come within the purposes of the improvements or the scope of the following claims.

What is claimed is:

1. An illumination optical system, comprising:
   beam dividing means for dividing a radiation beam into plural illumination beams; and
   an optical arrangement for superposing the illumination beams one upon another on a surface to be illuminated, said optical arrangement comprising an anamorphic optical system having different focal lengths in substantially orthogonal first and second directions, and said anamorphic optical system being adapted to focus each of the illumination beams on said surface in the first direction while defocusing the same in the second direction, whereby a linear illumination region is defined on said surface.

2. A system according to claim 1, wherein said beam dividing means divides a wavefront of the radiation beam.

3. A system according to claim 2, wherein the radiation beam comprises a laser beam.

4. A system according to claim 3, further comprising an excimer laser which supplies the laser beam.

5. A system according to claim 3, wherein said anamorphic optical system focuses each of the illumination beams with respect to a direction of beam division by said beam dividing means, and said optical arrangement comprises a collecting optical system for focusing each of the illumination beams from said anamorphic optical system upon said surface with respect to a direction perpendicular to the direction of beam division while defocusing the same with respect to the direction of beam division.

6. A system according to claim 5, wherein said anamorphic optical system comprises a cylindrical lens.

7. A system according to claim 5, wherein said collecting optical system has the same focal length with respect to the direction of beam division and the direction perpendicular to the direction of beam division.

8. A system according to claim 5, wherein said beam dividing means divides the radiation beam so that central rays of the illumination beams intersect with each other at a front focal point position of said anamorphic optical system with respect to the direction of beam division.

9. A system according to claim 8, wherein said beam dividing means comprises at least one prism for deflecting at least one of the illumination beams.

10. A system according to claim 5, further comprising an excimer laser for supplying the laser beam.

11. An optical apparatus for exposing a workpiece, comprising:
    beam dividing means for dividing a radiation beam into plural illumination beams; and
    an optical arrangement for superposing the illumination beams one upon another on a mask, said optical arrangement comprising an anamorphic optical system having different focal lengths in substantially orthogonal first and second directions, and said anamorphic optical system being adapted to focus each of the illumination beams on the mask in the first direction while defocusing the same in the second direction, whereby a linear illumination region is defined on the mask, wherein the illumination region is defined in a linear pattern region on the mask and the workpiece is exposed in accordance with a pattern provided in the pattern region of the mask.

12. An apparatus according to claim 11, wherein said beam dividing means divides a wavefront of the radiation beam.

13. An apparatus according to claim 12, wherein the radiation beam comprises a laser beam.

14. An apparatus according to claim 13, further comprising an excimer laser which supplies the laser beam.

15. An apparatus according to claim 13, wherein said anamorphic optical system focuses each of the illumination beams with respect to a direction of beam division by said beam dividing means, and said optical arrangement comprises a collecting optical system for focusing each of the illumination beams from said anamorphic optical system upon the mask with respect to a direction perpendicular to the direction of beam division while defocusing the same with respect to the direction of beam division.

16. An apparatus according to claim 15, wherein said anamorphic optical system comprises a cylindrical lens.

17. An apparatus according to claim 15, wherein said collecting optical system has the same focal length with respect to the direction of beam division and the direction perpendicular to the direction of beam division.

18. An apparatus according to claim 15, wherein said beam dividing means divides the radiation beam so that central rays of the illumination beams intersect with each other at a front focal point position of said anamorphic optical system with respect to the direction of beam division.

19. An apparatus according to claim 18, wherein said beam dividing means comprises at least one prism for deflecting at least one of the illumination beams.

20. An apparatus according to claim 15, further comprising an excimer laser for supplying the laser beam.

21. An apparatus according to claim 13, further comprising a projection optical system for imaging the pattern of the mask onto the workpiece.

22. An illumination optical system, comprising:
a laser for emitting a laser beam;
beam dividing means for dividing a wavefront of the laser beam from said laser to form a plurality of illumination beams; and
an optical arrangement for superposing the illumination beams one upon another on a surface to be illuminated, said optical arrangement comprising an anamorphic optical system having different focal lengths in substantially orthogonal first and second directions, and said anamorphic optical system being adapted to focus each of the illumination beams on said surface in the first direction while defocusing the same in the second direction, whereby a linear illumination region is defined on said surface, wherein said anamorphic optical system focuses each of the illumination beams with respect to a direction of beam division by said beam dividing means, and said optical arrangement comprises a collecting optical system for focusing each of the illumination beams from said anamorphic optical system upon said surface with respect to a direction perpendicular to the direction of beam division while defocusing the same with respect to the direction of beam division.

23. A system according to claim 22, wherein said laser comprises an excimer laser.

24. A system according to claim 23, wherein said anamorphic optical system comprises a cylindrical lens.

25. A system according to claim 23, wherein said collecting optical system has the same focal length with respect to the direction of beam division and the direction perpendicular to the direction of beam division.

26. A system according to claim 23, wherein said beam dividing means divides the radiation beam so that central rays of the illumination beams intersect with each other at a front focal point position of said anamorphic optical system with respect to the direction of beam division.

27. A system according to claim 26, wherein said beam dividing means comprises two prisms for deflecting two of the illumination beams.

28. An optical apparatus for exposing a workpiece, comprising:
a laser for emitting a laser beam;
beam dividing means for dividing a wavefront of the laser beam from said laser to form a plurality of illumination beams; and
an optical arrangement for superposing the illumination beams one upon another on a mask, said optical arrangement comprising an anamorphic optical system having different focal lengths in substantially orthogonal first and second directions, and said anamorphic optical system being adapted to focus each of the illumination beams on the mask in the first direction while defocusing the same in the second direction, whereby a linear illumination region is defined on the mask, wherein the illumination region is defined in a linear pattern region on the mask and the workpiece is exposed in accordance with a pattern provided in the pattern region of the mask, said anamorphic optical system focuses each of the illumination beams with respect to a direction of beam division by said beam dividing means, and said optical arrangement comprising a collecting optical system for focusing each of the illumination beams from said anamorphic optical system upon the mask with respect to a direction perpendicular to the direction of beam division while defocusing the same with respect to the direction of beam division.

29. An apparatus according to claim 28, wherein said laser comprises an excimer laser.

30. An apparatus according to claim 29, wherein said anamorphic optical system comprises a cylindrical lens.

31. An apparatus according to claim 29, wherein said collecting optical system has the same focal length with respect to the direction of beam division and the direction perpendicular to the direction of beam division.

32. An apparatus according to claim 29, wherein said beam dividing means divides the radiation beam so that central rays of the illumination beams intersect with each other at a front focal point position of said anamorphic optical system with respect to the direction of beam division.

33. An apparatus according to claim 32, wherein said beam dividing means comprises two prisms for deflecting two of the illumination beams.

34. A device manufacturing method for forming a device pattern on a workpiece by using an apparatus as recited in any one of claims 28 through 33.

35. A method according to claim 34, wherein the device pattern comprises a pattern of an ink discharging outlet array of a nozzle plate.

36. A system according to claim 1, wherein said beam dividing means divides the radiation beam in a direction the same as the first direction.

37. An apparatus according to claim 11, wherein said beam dividing means divides the radiation beam in a direction the same as the first direction.

38. An illumination optical system, comprising:

beam dividing means for dividing a radiation beam into plural illumination beams; and an optical arrangement for superposing the illumination beams one upon another on a surface to be illuminated, said optical arrangement comprising an anamorphic optical system which is adapted to focus each of the illumination beams on said surface in a first direction while defocusing the same in a second direction perpendicular to the first direction, whereby a linear illumination region is defined on said surface.

39. A system according to claim 38, wherein said beam dividing means divides the radiation beam in a direction the same as the first direction.

40. An optical apparatus for processing a workpiece, comprising:

beam dividing means for dividing a radiation beam into plural illumination beams; and an optical arrangement for superposing the illumination beams one upon another on a mask, said optical arrangement comprising an anamorphic optical system which is adapted to focus each of the illumination beams on the mask in a first direction while defocusing the same in a second direction perpendicular to the first direction, whereby a linear illumination region is defined on the mask, wherein the illumination region is defined in a linear pattern region on the mask and the workpiece is exposed in accordance with a pattern provided in the pattern region of the mask.

41. An apparatus to claim 40, wherein said beam dividing means divides the radiation beam in a direction the same as the first direction.

42. A device manufacturing method for forming a device pattern on a workpiece by using an apparatus as recited in any one of claims 11 through 21 and 36 through 41.

43. A method according to claim 42, wherein the device pattern comprises a pattern of an ink discharging outlet array of a nozzle plate.

* * * * *

UNITED STATES PATENT AND TRADEMARK OFFICE
CERTIFICATE OF CORRECTION

PATENT NO. : 5,828,496

DATED : October 27, 1998

INVENTORS : MASAYUKI NISHIWAKI, ET AL.

It is certified that error appears in the above-identified patent and that said Letters Patent is hereby corrected as shown below:

COLUMN 5:

line 24, "division," should read --division--.

COLUMN 10:

line 11, "apparatus" should read --apparatus according--.

Signed and Sealed this

Eighth Day of June, 1999

Attest:

Q. TODD DICKINSON

Attesting Officer     Acting Commissioner of Patents and Trademarks